United States Patent
Linton et al.

(10) Patent No.: US 11,665,180 B2
(45) Date of Patent: May 30, 2023

(54) ARTIFICIALLY INTELLIGENT SECURITY INCIDENT AND EVENT MANAGEMENT

(71) Applicant: INTERNATIONAL BUSINESS MACHINES CORPORATION, Armonk, NY (US)

(72) Inventors: Jeb R. Linton, Manassas, VA (US); Darrel Haswell, Austin, TX (US); Satya Sreenivas, Los Alamos, NM (US); Naeem Altaf, Round Rock, TX (US); Sanjay Nadhavajhala, Cupertino, CA (US); Ron Williams, Austin, TX (US); Bradley Evan Harris, Sandy Springs, GA (US); John Walter Morris, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 16/804,898

(22) Filed: Feb. 28, 2020

(65) Prior Publication Data
US 2021/0273954 A1 Sep. 2, 2021

(51) Int. Cl.
*H04L 29/06* (2006.01)
*G06N 3/08* (2023.01)
(Continued)

(52) U.S. Cl.
CPC ...... *H04L 63/1416* (2013.01); *G06F 18/2155* (2023.01); *G06N 3/088* (2013.01); *H04L 63/1425* (2013.01)

(58) Field of Classification Search
CPC ............ H04L 63/1425; H04L 63/1416; G06K 9/6259; G06N 3/088
See application file for complete search history.

(56) References Cited

U.S. PATENT DOCUMENTS

| 9,900,338 B2 * | 2/2018 | Ahmed | G06N 3/08 |
| 10,187,413 B2 * | 1/2019 | Vasseur | H04L 63/1425 |

(Continued)

FOREIGN PATENT DOCUMENTS

WO 2018151745 8/2018

OTHER PUBLICATIONS

Paquette, "Using Machine Learning and Elasticsearch for Security Analytics: A Deep Dive", May 17, 2017, 6 pages.
(Continued)

*Primary Examiner* — Kambiz Zand
*Assistant Examiner* — Afaq Ali
(74) *Attorney, Agent, or Firm* — Scott Dobson; Andrew D. Wright; Calderon Safran & Cole, P.C.

(57) ABSTRACT

Methods and systems for artificially intelligent security incident and event management using an attention-based deep neural network and transfer learning are disclosed. A method includes: collecting, by a computing device, system and network activity events in bulk; forming, by the computing device, a corpus using the collected system and network activity events; correlating, by the computing device, discrete events of the system and network activity events into offenses; adding, by the computing device, additional features to the corpus representing the offenses and disposition decisions regarding the offenses; training, by the computing device, a deep neural network using the corpus; and tuning, by the computing device, the deep neural network for a monitored computing environment using transfer learning.

20 Claims, 7 Drawing Sheets

(51) Int. Cl.
    *G06K 9/62*     (2022.01)
    *H04L 9/40*     (2022.01)
    *G06N 3/088*     (2023.01)
    *G06F 18/214*     (2023.01)

(56) References Cited

U.S. PATENT DOCUMENTS

| | | | |
|---|---|---|---|
| 10,542,017 B1* | 1/2020 | Gates | G06N 20/00 |
| 10,558,925 B1* | 2/2020 | Flor | G06N 3/04 |
| 11,037,059 B2* | 6/2021 | Baker | G06N 3/0454 |
| 11,108,787 B1* | 8/2021 | Shen | G06N 3/08 |
| 2015/0052606 A1 | 2/2015 | Romero Bueno et al. | |
| 2016/0337400 A1 | 11/2016 | Gupta | |
| 2018/0004948 A1* | 1/2018 | Martin | H04L 63/1425 |
| 2018/0219889 A1 | 8/2018 | Oliner et al. | |
| 2019/0012234 A1* | 1/2019 | Grube | G06F 3/0659 |
| 2019/0109868 A1* | 4/2019 | Muddu | H04L 43/08 |
| 2019/0138938 A1* | 5/2019 | Vasseur | G06N 20/00 |
| 2019/0182273 A1 | 6/2019 | Walsh et al. | |
| 2019/0199739 A1 | 6/2019 | Anderson et al. | |
| 2019/0222601 A1* | 7/2019 | Bardenstein | H04L 63/1408 |
| 2020/0204571 A1* | 6/2020 | Neznal | H04L 63/1425 |
| 2020/0394526 A1* | 12/2020 | Kim | G06K 9/6271 |
| 2021/0021636 A1* | 1/2021 | Sbandi | H04L 63/1441 |
| 2021/0192392 A1* | 6/2021 | Oki | G06N 20/00 |

OTHER PUBLICATIONS

Mell et al., "The NIST Definition of Cloud Computing", NIST, Special Publication 800-145, Sep. 2011, 7 pages.

* cited by examiner

ARTIFICIALLY INTELLIGENT SECURITY INCIDENT AND EVENT MANAGEMENT

BACKGROUND

Aspects of the present invention generally relate to computing devices and, more particularly, to methods and systems for artificially intelligent security incident and event management using an attention-based deep neural network and transfer learning.

Security Incident and Event Management (SIEM) systems such as IBM QRadar® (a registered trademark of International Business Machines Corporation) collect system and network activity event data across a computing environment and typically rely on predefined rules to correlate discrete event data into aggregate events (sometimes called offenses) which may be indicative of malicious activity. SIEM systems may prioritize these aggregate events for human analysis.

SUMMARY

In a first aspect of the invention, there is a method that includes: collecting, by a computing device, system and network activity events in bulk; forming, by the computing device, a corpus using the collected system and network activity events; correlating, by the computing device, discrete events of the system and network activity events into offenses; adding, by the computing device, additional features to the corpus representing the offenses and disposition decisions regarding the offenses; training, by the computing device, a deep neural network using the corpus; and tuning, by the computing device, the deep neural network for a monitored computing environment using transfer learning.

In another aspect of the invention, there is a computer program product that includes one or more computer readable storage media, and program instructions collectively stored on the one or more computer readable storage media. The program instructions include: program instructions to fit a trained deep neural network with a predictive generator head; program instructions to predict future system and network activity events using the trained deep neural network fitted with the predictive generator head; program instructions to fit the trained deep neural network with a classifier head; and program instructions to classify the predicted future system and network activity events using the trained deep neural network fitted with the classifier head.

In another aspect of the invention, there is a system that includes a hardware processor, a computer readable memory, and one or more computer readable storage media associated with a computing device; program instructions to collect system and network activity events in bulk; program instructions to form a corpus using the collected system and network activity events; program instructions to correlate discrete events of the system and network activity events into offenses; program instructions to add additional features to the corpus representing the offenses and disposition decisions regarding the offenses; program instructions to train a deep neural network using the corpus; and program instructions to tune the deep neural network for a monitored computing environment using transfer learning, wherein the program instructions are collectively stored on the one or more computer readable storage media for execution by the hardware processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
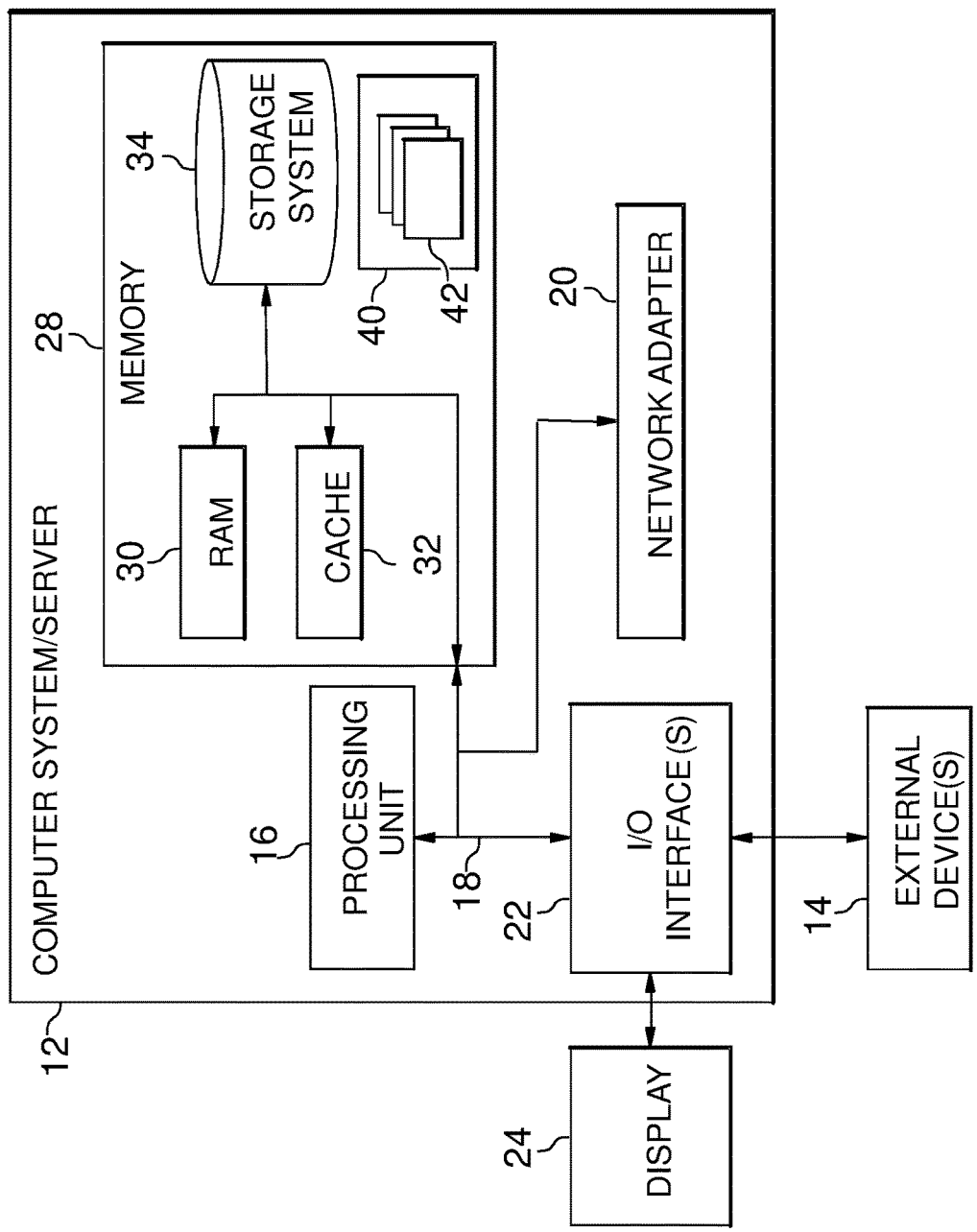
FIG. 1 depicts a cloud computing node according to an embodiment of the present invention.

Aspects of the present invention generally relate to computing devices and, more particularly, to methods and systems for artificially intelligent security incident and event management using an attention-based deep neural network and transfer learning. As described herein, aspects of the invention include a method and system that train a deep neural network using a corpus of discrete events that are correlated into offenses and refine the deep neural network using transfer learning. Aspects of the invention also include a method and system that use the trained deep neural network to classify events in a computer system or network as normal or malicious. Aspects of the invention also include a method and system that use the trained deep neural network to predict likely future events in a computer system or network.

In embodiments, an architecture is provided for building a system and network activity model using an attention-based architecture such as the OpenAI Transformer to form the backbone. In embodiments, secure enclaves and transfer learning are used to securely distribute and refine the model. In embodiments, the model is trained using a combination of supervised learning techniques.

In embodiments, an artificial intelligence-based SIEM is provided that is based on a deep neural network architecture. In embodiments, a transformer or similar attention-based sequence predictor is used to cluster system and network activity for labeling (either automatically or by a human analyst) to identify and distinguish normal system activity from malicious or questionable activity, and to identify anomalous activity which warrants further analysis and manual labeling. In embodiments, a combination of techniques is used in sequence, in order to make best use of available labels for semi-supervised training.

Embodiments address problems with the performance and accuracy of conventional SIEM systems in classifying events as normal or malicious and predicting the occurrence of future malicious events. Accordingly, embodiments improve the functioning of a computer by providing methods and systems for artificially intelligent security incident and event management using an attention-based deep neural network and transfer learning. In particular, embodiments improve the functioning of a computer by providing a method and system that train a deep neural network using a corpus of discrete events that are correlated into offenses and refine the deep neural network using transfer learning. Embodiments also improve the functioning of a computer by providing a method and system that use the trained deep neural network to classify events in a computer system or network as normal or malicious. Embodiments also improve the functioning of a computer by providing a method and system that use the trained deep neural network to predict likely future events in a computer system or network.

Additionally, implementations of the invention use techniques that are, by definition, rooted in computer technology (e.g., SIEM systems, machine learning, deep neural networks, and cloud computing).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
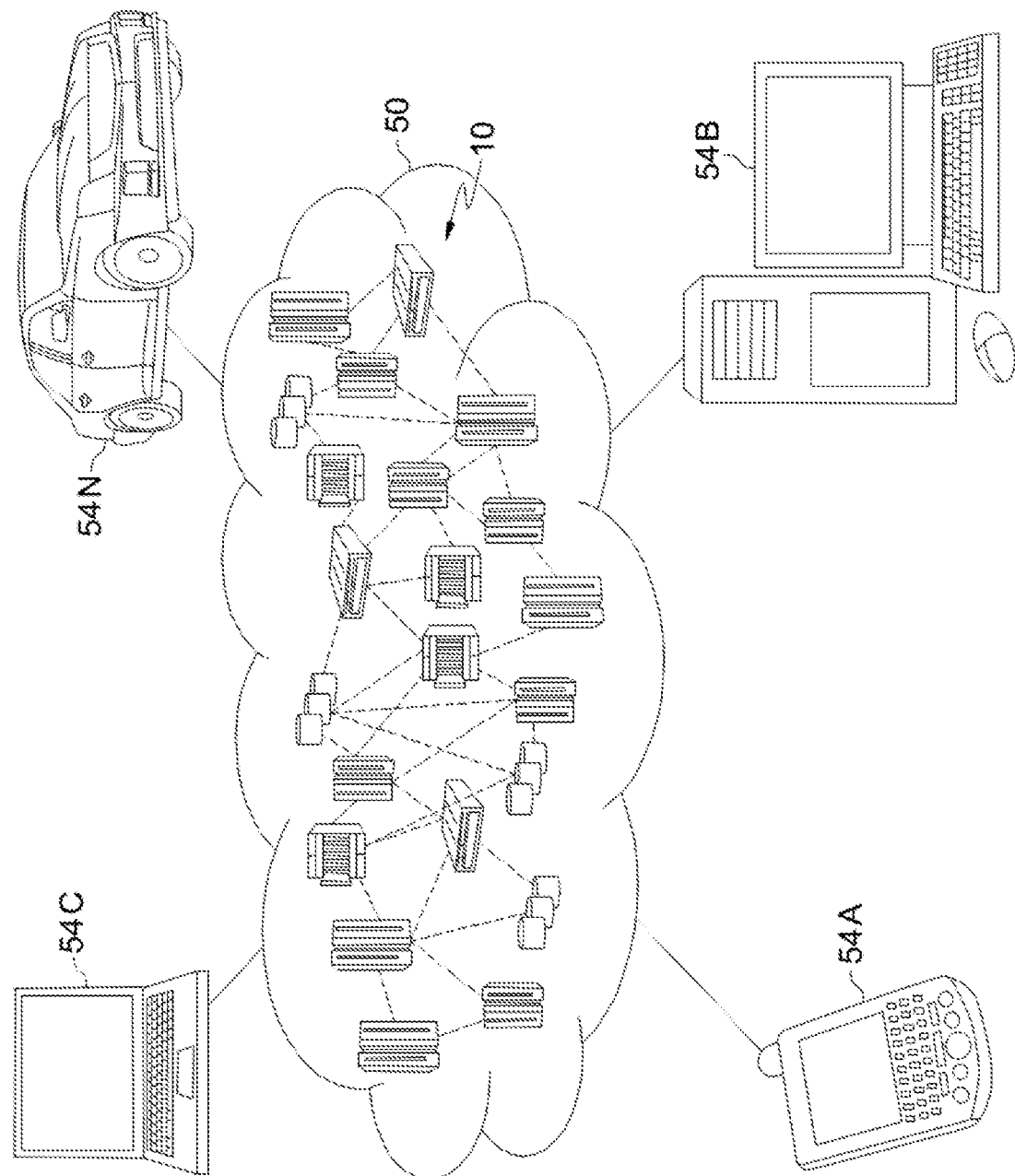
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
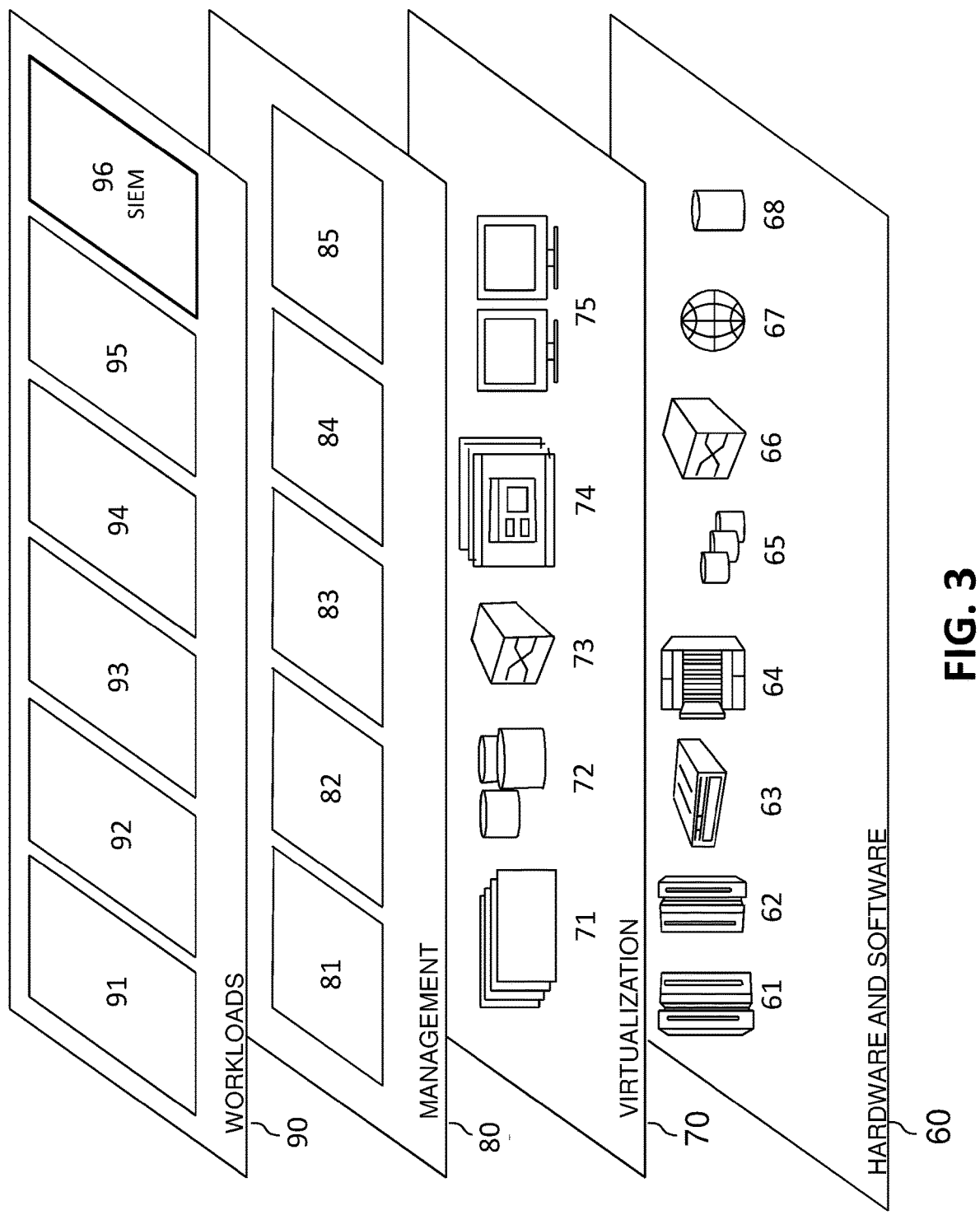
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and STEM 96.

Referring back to FIG. 1, the program/utility 40 may include one or more program modules 42 that generally carry out the functions and/or methodologies of embodiments of the invention as described herein (e.g., such as the functionality provided by SIEM 96). Specifically, the program modules 42 may train a deep neural network using a corpus of discrete events that are correlated into offenses and refine the deep neural network using transfer learning. Additionally, the program modules 42 use the trained deep neural network to classify events in a computer system or network as normal or malicious and use the trained deep neural network to predict likely future events in a computer system or network. Other functionalities of the program modules 42 are described further herein such that the program modules 42 are not limited to the functions described above. Moreover, it is noted that some of the program modules 42 can be implemented within the infrastructure shown in FIGS. 1-3. For example, the program modules 42 may be representative of a SIEM program module 420 and a SIEM client program module 450 as shown in FIG. 4.

Figure 4:
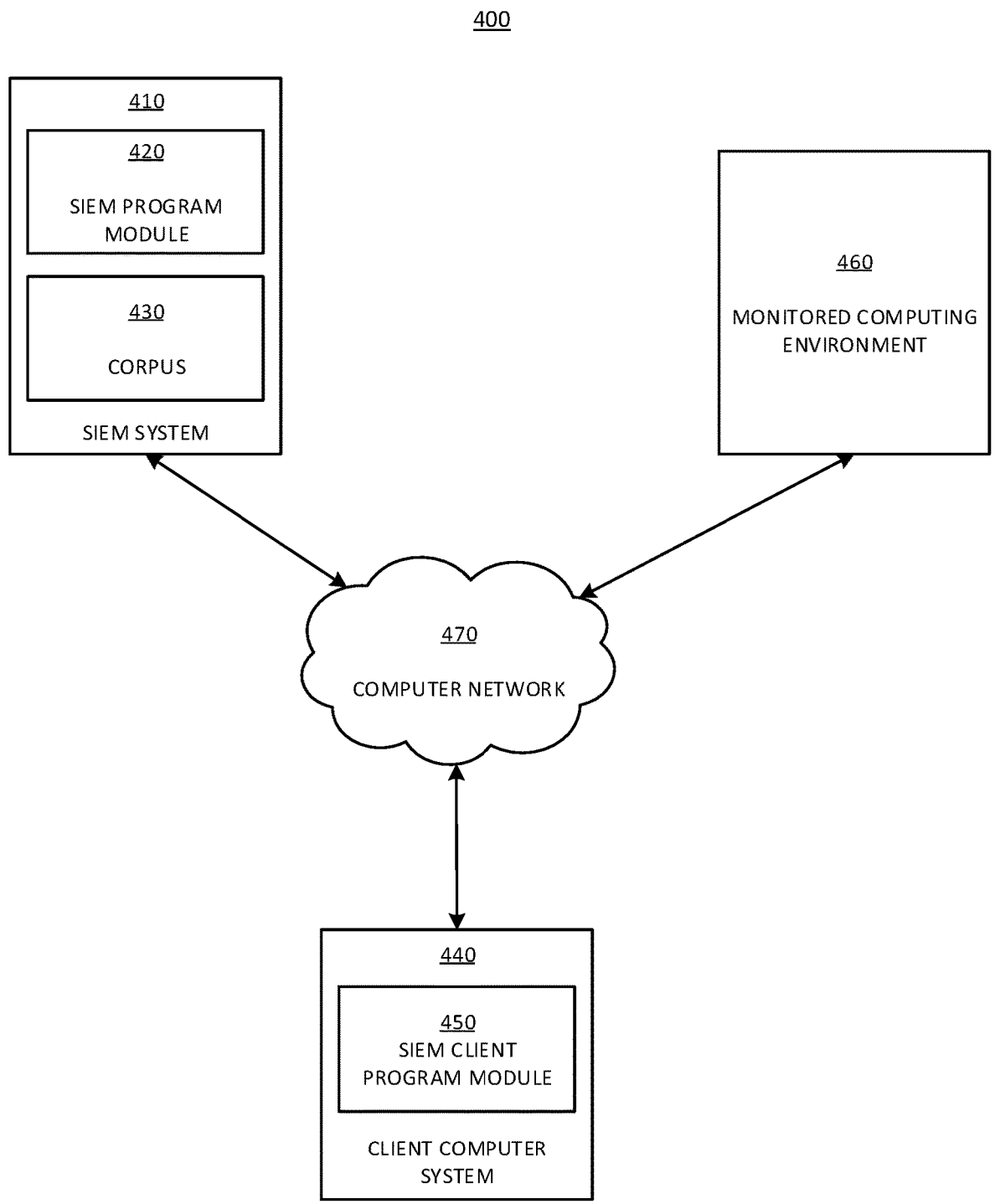
FIG. 4 depicts an illustrative environment in accordance with aspects of the invention.

FIG. 4 depicts an illustrative environment 400 in accordance with aspects of the invention. As shown, the environment 400 comprises a SIEM system 410, a client computer system 440, and at least one monitored computing environment 460 which are in communication via a computer network 470. In embodiments, the computer network 470 is any suitable network including any combination of a LAN, WAN, or the Internet. In embodiments, the SIEM system 410, the client computer system 440, and the at least one monitored computing environment 460 are physically collocated, or, more typically, are situated in separate physical locations.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400.

In embodiments, the SIEM system 410 in the environment 400 is situated in the cloud computing environment 50 and is one or more of the nodes 10 shown in FIG. 2. The SIEM system 410 is implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

In embodiments, the SIEM system 410 includes a SIEM program module 420 which comprises one or more of the program modules 42 shown in FIG. 1. In embodiments, the SIEM program module 420 includes program instructions for training a deep neural network using a corpus of discrete events that are correlated into offenses and refining the deep neural network using transfer learning, as discussed herein. Additionally, in embodiments, the SIEM program module 420 includes program instructions for using the trained deep neural network to classify events in a computer system or network as normal or malicious and use the trained deep neural network to predict likely future events in a computer system or network. In embodiments, the program instructions included in the SIEM program module 420 of the SIEM system 410 are executed by one or more hardware processors. In embodiments, the SIEM system 410 also includes a corpus 430, which includes information about system and network events, which may be implemented using any type of memory (e.g., RAM) or storage device (e.g., hard disk drive, solid state drive, etc.) and/or one or more of the program modules 42 including program instructions that are executed by one or more hardware processors.

Still referring to FIG. 4, in embodiments, the client computer system 440 in the environment 400 includes one or more components of the computer system/server 12 (as shown in FIG. 1). In other embodiments, the client computer system 440 in the environment 400 is situated in the cloud computing environment 50 and is one or more of the nodes 10 shown in FIG. 2. In an example, the client computer system 440 is implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3. In other embodiments, the client computer system 440 is a desktop computer, a laptop computer, a mobile device such as a cellular phone, tablet, personal digital assistant (PDA), or any other computing device.

In embodiments, the client computer system 440 includes a SIEM client program module 450 which comprises one or more of the program modules 42 shown in FIG. 1. In embodiments, the SIEM client program module 450 includes program instructions for refining a deep neural network using transfer learning, as discussed herein. Additionally, in embodiments, the SIEM client program module 450 includes program instructions for using the trained deep neural network to classify events in a computer system or network as normal or malicious and use the trained deep neural network to predict likely future events in a computer system or network. In embodiments, the program instructions included in the SIEM client program module 450 of the client computer system 440 are executed by one or more hardware processors.

Still referring to FIG. 4, in embodiments, each of the at least one monitored computing environment 460 in the environment 400 is implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3. In embodiments, the at least one monitored computing environment 460 in the environment 400 may be situated in the cloud computing environment 50 and may be one or more of the nodes 10 shown in FIG. 2. In embodiments, the SIEM program module 420 of the SIEM system 410 and/or the SIEM client program module 450 of the client computer system 440 monitor the at least one monitored computing environment 460 to identify malicious system and network activity.

Figure 5:
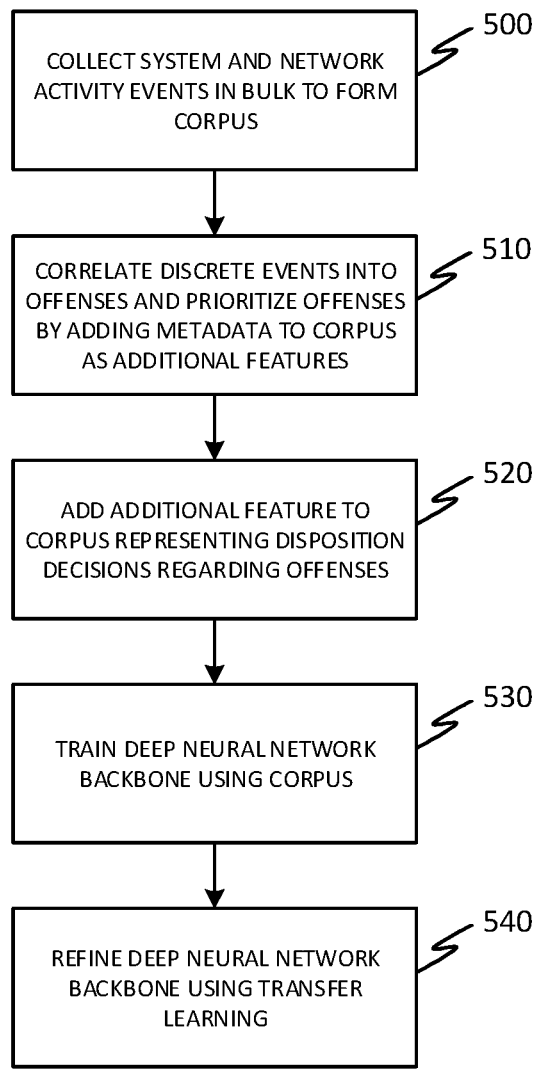
FIGS. 5, 6, and 7 depict flowcharts of exemplary methods performed in accordance with aspects of the invention.

FIG. 5 depicts a flowchart of an exemplary method for training a deep neural network using a corpus of discrete events that are correlated into offenses and refining the deep neural network using transfer learning. The method of FIG. 5 is performed by the SIEM program module 420 of the SIEM system 410 and the SIEM client program module 450 of the client computer system 440 in accordance with aspects of the invention. The steps of the method are performed in the environment of FIG. 4 and are described with reference to the elements shown in FIG. 4.

At step 500, the SIEM system 410 collects system and network activity events in bulk to form the corpus 430. In embodiments, the SIEM program module 420 of the SIEM system 410 collects the system and network activity events in bulk from each of the at least one monitored computing environment 460 using a full raw feed (e.g., from QRadar Collectors, etc.). In embodiments, the collected system and network activity events are stored by the SIEM program module 420 as the corpus 430 for further enhancement and analysis, as described below.

Still referring to FIG. 5, at step 510, the STEM system 410 correlates discrete events into offenses and prioritizes offenses by adding metadata to the corpus 430 as additional features. In embodiments, the STEM program module 420 of the STEM system 410 leverages rules (e.g., in QRadar, etc.) that correlate discrete events (e.g., Syslog, Netflow, etc.) into offenses and prioritizes offenses by adding metadata to the corpus 430 regarding the prioritized offenses as additional features.

Still referring to FIG. 5, at step 520, the STEM system 410 adds an additional feature to the corpus 430 representing disposition decisions regarding offenses. In embodiments, the STEM program module 420 of the SIEM system 410 adds the additional feature to the corpus 430 representing the disposition decisions regarding offenses. In embodiments, the SIEM program module 420 obtains information about the disposition decisions regarding offenses from a record of decisions to escalate certain offenses (or equivalent) and decisions to not escalate or take remediative action with respect to other offenses.

Still referring to FIG. 5, at step 530, the SIEM system 410 trains a deep neural network backbone using the corpus 430. In embodiments, the SIEM program module 420 of the SIEM system 410 trains the deep neural network backbone using the corpus 430. In embodiments, the corpus 430, which was generated according to steps 500, 510, and 520 by the SIEM program module 420, includes sufficient features to begin an unsupervised/semi-supervised phase of training. In embodiments, the backbone of the deep neural net is a transformer or similar attention-based design that remains the same; only the head varies by type of training and specific task.

Still referring to step 530, in an embodiment, the SIEM program module 420 uses self-supervision comparable to that used to train very large language models such as BERT and GPT-2 to train the deep neural network backbone to predict a next network or system event in a time series. Specifically, data elements are dropped from the training data set (i.e., the corpus 430), and the deep neural network predicts or guesses what kind of datum was dropped using a predictive generator head on a transformer backbone. In embodiments, a small percent of the system and network activity events from the corpus 430 are dropped, and a loss function is defined as how accurately the model guesses what was dropped. In embodiments, the accuracy may be lower than 15% because of the less linear and deterministic nature of the data. In embodiments, once the deep neural network backbone is trained, the head of the deep neural network is replaced with a simple multi-label classifier, classifying activity as malign or benign, with labels for specific categories of malign (and optionally benign) activity (e.g., malware, escalation of privileges, etc.).

Still referring to step 530, in another embodiment, the SIEM program module 420 uses unsupervised learning in the form of dimensionality reduction to train the deep neural network backbone. In this embodiment, the simple activity predictor described above is replaced with an autoencoder head on a transformer backbone. In embodiments, the autoencoder architecture forces the high-dimensionality of the input data into a small number of outputs, thus compressing the significant information into output which "clusters" the data for easier manual analysis. In an example, the SIEM program module 420 produces clusters of activity which are broadly benign or malign, and within the malign category, identifiable clusters representing different categories of malign activity are produced. In embodiments, analysts tag those clusters with labels for supervised learning. In embodiments, once the deep neural network backbone is trained, the head of the deep neural network is replaced with a simple multi-label classifier, classifying activity as malign or benign, with labels for specific categories of malign (and optionally benign) activity (e.g., malware, escalation of privileges, etc.).

Still referring to step 530, in yet another embodiment, the STEM program module 420 uses a sequence-to-sequence head in place of an activity detector head or an autoencoder head. In this embodiment, a human may label sequences of system and network traffic with textual descriptions. The sequence-to-sequence head then effectively "translates" the "language" from system and network activity events to textual descriptions. In particular, in embodiments, humans analyze clusters and create textual descriptions of traffic flows, the SIEM program module 420 uses a sequence-to-sequence style head to train the deep neural network on textual descriptions matching traffic flows, and the SIEM program module 420 uses a generative head to "translate" real-time activity to text descriptions.

Still referring to FIG. 5, at step 540, the SIEM system 410 refines the deep neural network backbone using transfer learning. In embodiments, the SIEM program module 420 of the SIEM system 410 securely distributes the trained deep neural network (i.e., base model) to the SIEM client program module 450 of the client computer system 440. In embodiments, the SIEM client program module 450 of the client computer system 440 then uses transfer learning to refine the trained deep neural network, which is a generalized model, for use on a client infrastructure (e.g., monitored computing environment 460). In embodiments, the SIEM client program module 450 refines the deep neural network by freezing the backbone of the deep neural network and training the top layers of the deep neural network (e.g., using the training techniques described with respect to step 530).

Figure 6:
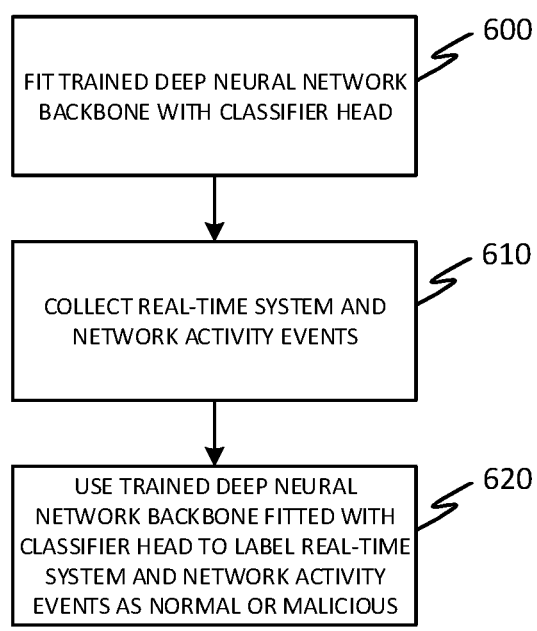

FIG. 6 depicts a flowchart of an exemplary method for using a deep neural network trained according to the method of FIG. 5 to classify events (e.g., system and network activity) in a computer system or network (e.g., monitored computing environment 460) as normal or malicious. The method of FIG. 6 is performed by the SIEM client program module 450 of the client computer system 440 in accordance with aspects of the invention. The steps of the method are performed in the environment of FIG. 4 and are described with reference to the elements shown in FIG. 4.

At step 600, the client computer system 440 fits a trained deep neural network backbone with a classifier head. In embodiments, the SIEM client program module 450 of the client computer system 440 fits a deep neural network that has been trained according to the method of FIG. 5 with a classifier head that uses the deep neural network to classify events (e.g., system and network activity) as normal or malicious. In embodiments, the classifier head is trained according to historical escalations, as described above with regard to step 530 of FIG. 5.

Still referring to FIG. 6, at step 610, the client computer system 440 collects real-time system and network activity events. In embodiments, the SIEM client program module 450 of the client computer system 440 collects the real-time system and network activity events from each of the at least one monitored computing environment 460 using a full raw feed (e.g., from QRadar Collectors, etc.).

Still referring to FIG. 6, at step 620, the client computer system 440 uses the trained deep neural network backbone fitted with the classifier head to label the real-time system and network activity events as normal or malicious. In embodiments, the SIEM client program module 450 of the client computer system 440 uses the trained deep neural network backbone fitted with the classifier head to label real-time system and network activity events collected from the at least one monitored computing environment 460 at step 610 as normal or malicious. In embodiments, the SIEM client program module 450 further labels malicious system and network activity events with a category of malicious activity (e.g., malware, escalation of privileges, etc.). In embodiments, upon classifying activity as malicious, the SIEM client program module 450 alerts or otherwise notifies a user (e.g., a system administrator) of the SIEM system.

Figure 7:
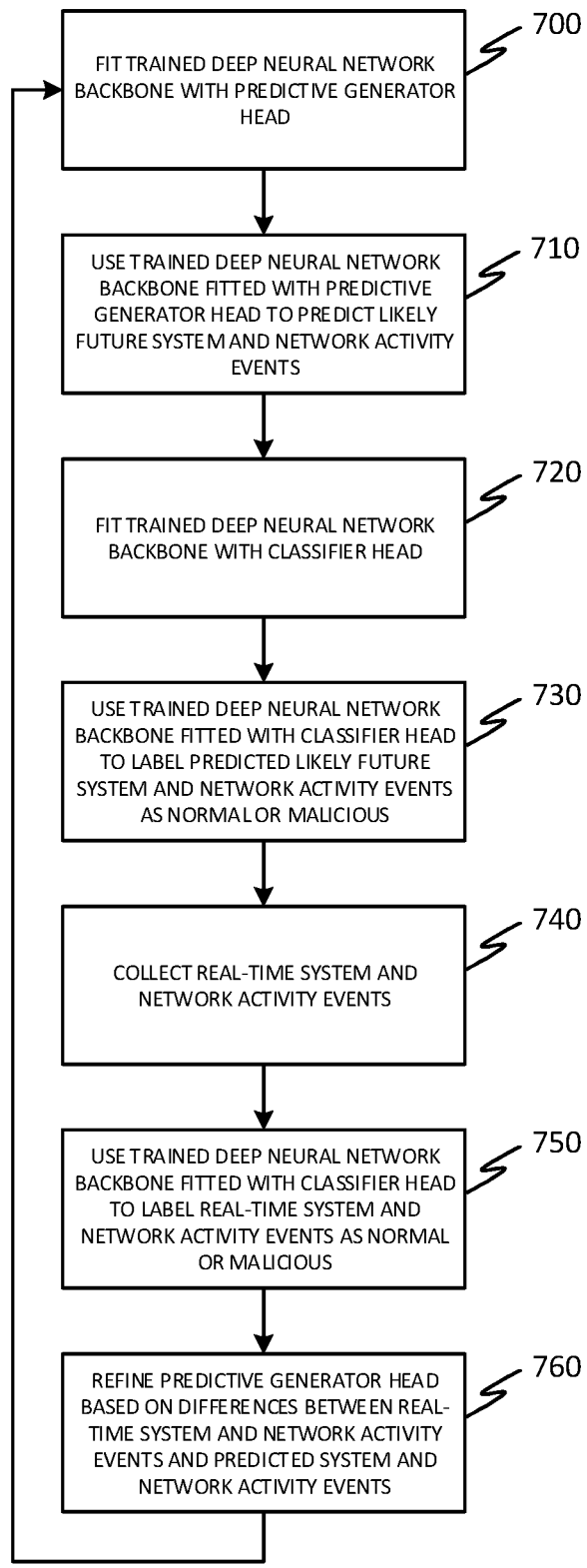

FIG. 7 depicts a flowchart of an exemplary method for using a deep neural network trained according to the method of FIG. 5 to predict likely future events (e.g., system and network activity) in a computer system or network (e.g., monitored computing environment 460). The method of FIG. 7 is performed by the SIEM client program module 450 of the client computer system 440 in accordance with aspects of the invention. The steps of the method are performed in the environment of FIG. 4 and are described with reference to the elements shown in FIG. 4.

At step 700, the client computer system 440 fits a trained deep neural network backbone with a predictive generator head. In embodiments, the SIEM client program module 450 of the client computer system 440 fits a deep neural network that has been trained according to the method of FIG. 5 with a predictive generator head that uses the deep neural network to predict future system and network activity events. In embodiments, the predictive generator head is trained using self-supervision or unsupervised learning techniques as described above with regard to step 530 of FIG. 5.

Still referring to FIG. 7, at step 710, the client computer system 440 uses the trained deep neural network backbone fitted with the predictive generator head to predict likely future system and network activity events. In embodiments, the SIEM client program module 450 of the client computer system 440 uses the trained deep neural network backbone fitted with the predictive generator head to predict future system and network activity events in the at least one monitored computing environment 460.

Still referring to FIG. 7, at step 720, the client computer system 440 fits the trained deep neural network backbone with a classifier head. In embodiments, the SIEM client program module 450 of the client computer system 440 fits the deep neural network with a classifier head that uses the deep neural network to classify events (e.g., system and network activity) as normal or malicious. In embodiments, the classifier head is trained according to historical escalations, as described above with regard to step 530 of FIG. 5.

Still referring to FIG. 7, at step 730, the client computer system 440 uses the trained deep neural network backbone fitted with the classifier head to label the predicted likely future system and network activity events as normal or malicious. In embodiments, the SIEM client program module 450 of the client computer system 440 uses the trained deep neural network backbone fitted with the classifier head to label the predicted likely future system and network activity events (from step 710) as normal or malicious. In embodiments, the SIEM client program module 450 further labels malicious system and network activity events with a category of malicious activity (e.g., malware, escalation of privileges, etc.).

Still referring to FIG. 7, at step 740, the client computer system 440 collects real-time system and network activity events. In embodiments, the SIEM client program module 450 of the client computer system 440 collects the real-time system and network activity events from each of the at least one monitored computing environment 460 using a full raw feed (e.g., from QRadar Collectors, etc.).

Still referring to FIG. 7, at step 750, the client computer system 440 uses the trained deep neural network backbone fitted with the classifier head to label the real-time system and network activity events as normal or malicious. In embodiments, the SIEM client program module 450 of the client computer system 440 uses the trained deep neural network backbone fitted with the classifier head to label the real-time system and network activity events collected from the at least one monitored computing environment 460 at step 740 as normal or malicious. In embodiments, the SIEM client program module 450 further labels malicious system and network activity events with a category of malicious activity (e.g., malware, escalation of privileges, etc.). In embodiments, upon classifying activity as malicious, the SIEM client program module 450 alerts or otherwise notifies a user (e.g., a system administrator) of the SIEM system.

Still referring to FIG. 7, at step 760, the client computer system 440 refines the predictive generator head based on the differences between the real-time system and network activity events and the predicted system and network activity events. In embodiments, the SIEM client program module 450 of the client computer system 440 compares the real-time system and network activity events (collected at step 740 and labeled at step 750) with the predicted likely future system and network activity events (generated at step 710 and labeled at step 730) and uses the comparison result to refine the predictive generator head of the deep neural network using machine learning techniques. In embodiments, the flow then returns to step 700.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   collecting, by a computing device, system and network activity events in bulk;
   forming, by the computing device, a corpus using the collected system and network activity events;
   correlating, by the computing device, discrete events of the system and network activity events into offenses;
   adding, by the computing device, additional features to the corpus representing the offenses and disposition decisions regarding the offenses;
   training, by the computing device, a deep neural network using the corpus using supervised learning techniques, wherein the supervised learning techniques comprise tagging clusters with labels; and
   refining, by the computing device, the deep neural network for a monitored computing environment using transfer learning,
   wherein refining the deep neural network comprises:
      freezing a backbone of the deep neural network; and
      training top layers of the deep neural network.

2. The method according to claim 1, wherein the system and network activity events are collected from the monitored computing environment.

3. The method according to claim 1, further comprising prioritizing, by the computing device, the offenses and adding metadata to the corpus regarding the prioritized offenses.

4. The method according to claim 1, wherein the training the deep neural network comprises using self-supervision.

5. The method according to claim 4, further comprising:
   randomly dropping, by the computing device, a portion of the system and network activity events from the corpus;
   predicting, by the computing device, the portion of the system and network activity events that was dropped; and
   determining, by the computing device, an accuracy of the portion of the system and network activity events that was predicted.

6. The method according to claim 1, wherein the training the deep neural network comprises using unsupervised learning including dimensionality reduction.

7. The method according to claim 6, further comprising the computing device using an autoencoder head to train the deep neural network.

8. A computer program product comprising:
   one or more computer readable storage media, and program instructions collectively stored on the one or more computer readable storage media, the program instructions comprising:
   program instructions to train a deep neural network using a corpus using supervised learning techniques, wherein the supervised learning techniques comprise tagging clusters with labels;
   program instructions to fit the trained deep neural network with a predictive generator head;
   program instructions to predict future system and network activity events using the trained deep neural network fitted with the predictive generator head;
   program instructions to fit the trained deep neural network with a classifier head; and
   program instructions to classify the predicted future system and network activity events using the trained deep neural network fitted with the classifier head.

9. The computer program product according to claim 8, further comprising:
   program instructions to collect real-time system and network activity events; and
   program instructions to classify the collected real-time system and network activity events using the trained deep neural network fitted with the classifier head.

10. The computer program product according to claim 9, further comprising program instructions to refine the predictive generator head based on differences between the collected real-time system and network activity events and the predicted future system and network activity events.

11. The computer program product according to claim 9, wherein the real-time system and network activity events are collected from a monitored computing environment.

12. The computer program product according to claim 8, wherein the predictive generator head is trained using self-supervision.

13. The computer program product according to claim 8, wherein the predictive generator head is trained using unsupervised learning.

14. A system comprising:
    a hardware processor, a computer readable memory, and one or more computer readable storage media associated with a computing device, wherein the computing device is a dispersed storage (DS) processing unit;
    program instructions to collect system and network activity events in bulk;
    program instructions to form a corpus using the collected system and network activity events;
    program instructions to correlate discrete events of the system and network activity events into offenses;
    program instructions to add additional features to the corpus representing the offenses and disposition decisions regarding the offenses;
    program instructions to train a deep neural network using the corpus using supervised learning techniques, wherein the supervised learning techniques comprise tagging clusters with labels; and
    program instructions to refine the deep neural network for a monitored computing environment using transfer learning,
    wherein the program instructions are collectively stored on the one or more computer readable storage media for execution by the hardware processor via the computer readable memory, and wherein the program instructions to refine the deep neural network comprise:

program instructions for freezing a backbone of the deep neural network; and program instructions for training top layers of the deep neural network.

15. The system according to claim 14, wherein the system and network activity events are collected from the monitored computing environment.

16. The system according to claim 14, further comprising program instructions to prioritize the offenses and adding metadata to the corpus regarding the prioritized offenses.

17. The system according to claim 14, wherein the training the deep neural network comprises using self-supervision.

18. The system according to claim 17, further comprising:

program instructions to randomly drop a portion of the system and network activity events from the corpus;

program instructions to predict the portion of the system and network activity events that was dropped; and program instructions to determine an accuracy of the portion of the system and network activity events that was predicted.

19. The system according to claim 14, wherein the training the deep neural network comprises using unsupervised learning including dimensionality reduction.

20. The system according to claim 19, further comprising program instructions to use an autoencoder head to train the deep neural network.

\* \* \* \* \*